March 24, 1936.  M. BRUSTOWSKY  2,035,259
SLICING MACHINE
Filed July 14, 1932   2 Sheets-Sheet 1
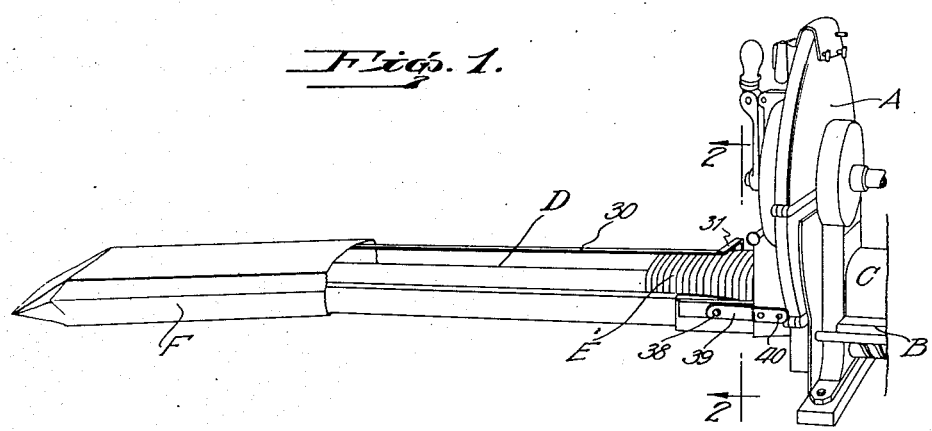
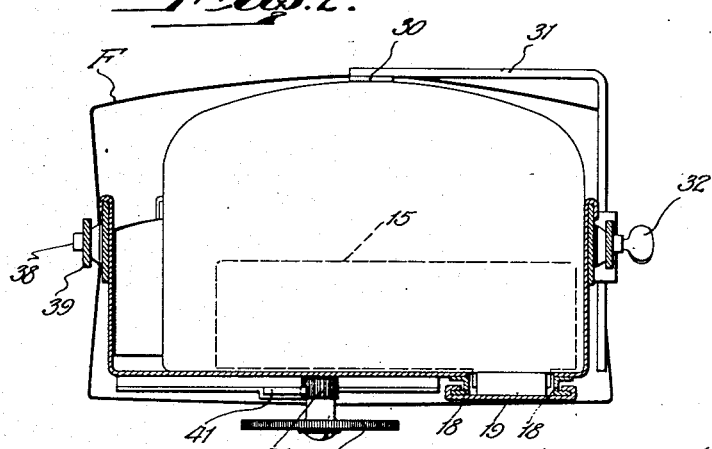
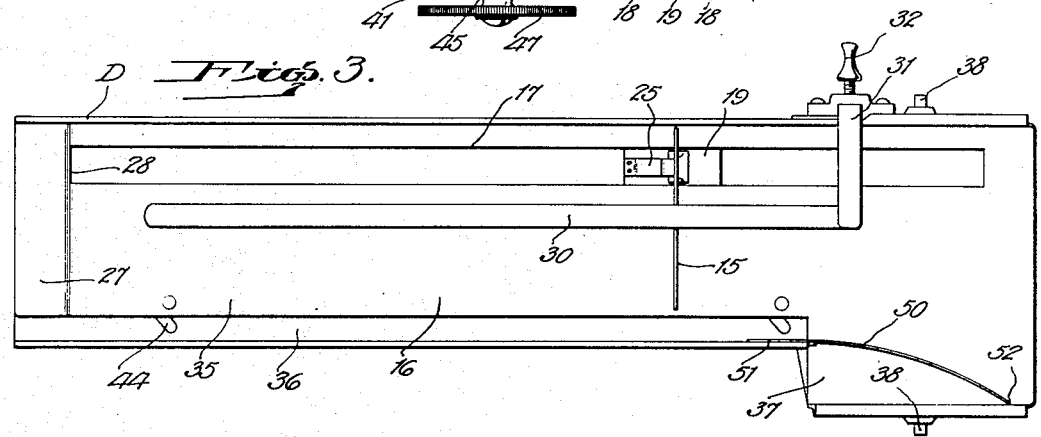
INVENTOR
MORRIS BRUSTOWSKY
BY Ely & Pattison
ATTORNEYS March 24, 1936.  M. BRUSTOWSKY  2,035,259
SLICING MACHINE
Filed July 14, 1932  2 Sheets-Sheet 2
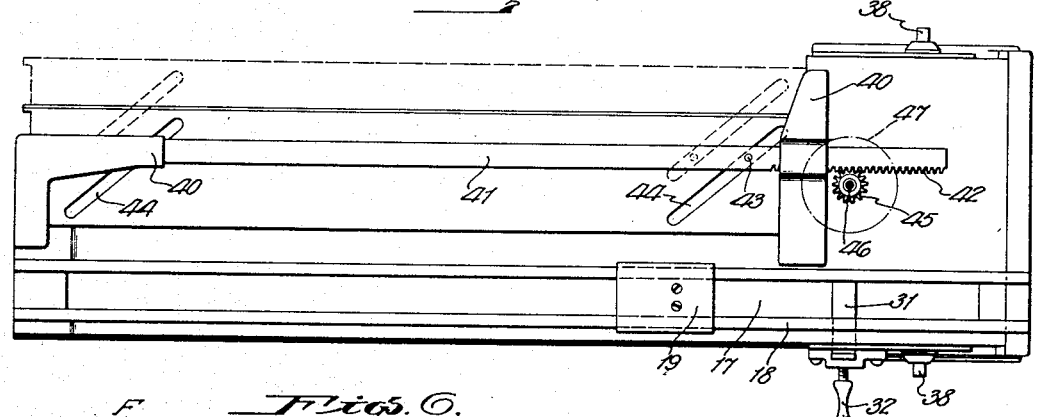
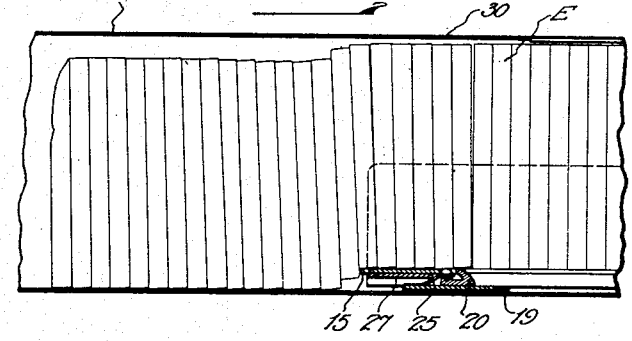
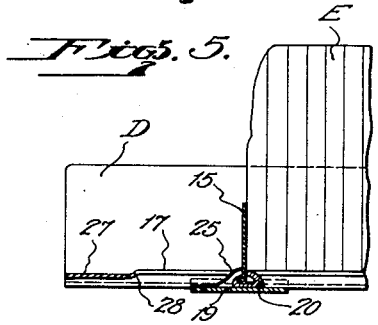
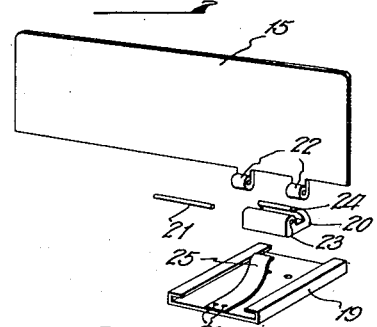
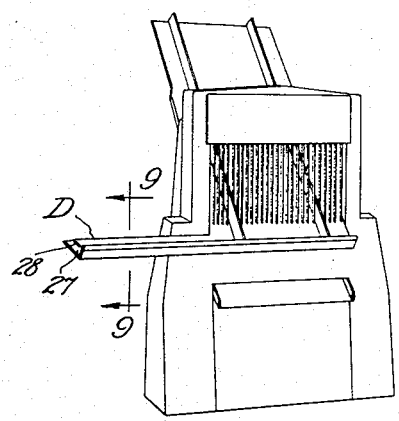
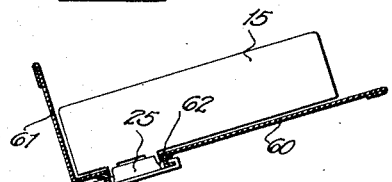
INVENTOR
MORRIS BRUSTOWSKY.
BY Ely Pattison.
ATTORNEYS

UNITED STATES PATENT OFFICE 2,035,259

SLICING MACHINE

Morris Brustowsky, Brooklyn, N. Y., assignor to U. S. Slicing Machine Company, La Porte, Ind., a corporation of Indiana Application July 14, 1932, Serial No. 622,523

18 Claims. (Cl. 226—18)

The present invention relates to new and useful improvements in slicing machines and while the invention has been herein disclosed as applied to a machine for slicing bread, it is to be understood that the invention is not limited to bread slicing machines and that it may be employed with machines for slicing other materials than bread.

In the past, bread slicing machines have been extensively used where it is desired to slice bread in large quantities such as in restaurants, hotels and the like. A demand, however, has been created in stores where bread is sold at retail to have the loaves sliced, since slicing by machine can be accomplished in such a manner as to produce slices of more uniform thickness and shape as distinguished from hand sliced bread, which is highly desirable.

Machines for slicing bread with which I am familiar are not particularly adapted for use in slicing of bread in stores where bread is sold at retail for the reason that the loaf after being sliced is awkward to handle in packaging and it often happens that the sliced loaf or a large portion thereof will fall upon the floor during the packaging operation thus entailing considerable waste.

It is one of the objects of the present invention, so to construct an attachment for slicing machines that the material in sliced form may be readily packaged without unnecessary handling and without danger of accidental dropping or disarrangement of the slices.

A feature of the invention resides in the provision of a new and novel tray for the reception of the material in sliced form.

The invention when employed in combination with a bread slicing machine is particularly adaptable to the receiving tray thereof and functions to retain the slices of bread in upright position in the tray and closely associated with one another.

A further feature of the invention resides in a novel construction whereby the bread in sliced form may be removed from the tray and packaged merely by sliding the closely associated slices through the tray from whence the slices are delivered in closely associated relation to a suitable wrapper or container.

A further feature of the invention resides in a novel construction whereby the operations aforementioned may be performed in an automatic manner except that the slices are preferably moved through the tray manually by the attendant or operative of the machine.

To the above ends, the invention includes a stop which is movable through the tray and which is maintained in an upright position in the tray to form an end wall therefor, which stop is, when it reaches a pre-determined position in the tray, so positioned therein that one of its flat faces will be flush or substantially so with the bottom wall of the tray to permit of the sliced material passing freely thereover to be discharged from the open end of the tray.

Another object of this invention is to provide a low end wall for the tray which is substantially less in height than the height of the material which is normally sliced by a slicing machine. Thus when a bag is placed over the end of a tray, and the end wall reaches the position at which it moves to a position flush with the bottom of the tray, the forward slices if they do fall will not fall flat on the bottom of the tray or the end wall in its latter position, but will at the most be merely tilted against the bottom of the bag so that when the remaining slices are forced into the bag, the endmost slices or slice will not be jammed crosswise but will lie flatly against the bottom of the bag. With an end wall that is as high as the slice, the forward slice can fall down in unison with the end wall and the remaining slices when pushed forwardly into the bag will cause the slice which has fallen to be crushed and this crushed slice will also prevent the entry of the remaining slices into proper position within the bag.

Another object of this invention is to so hold the bag or container that the edges thereof are in a position outside of the path of movement of the slices. This is particularly desirable where the bags are of a collapsible nature such as is the case with the ordinary folded bag which is supplied to the grocer.

More specifically an object of this invention is to hold the four walls of a bag in spaced relation a sufficient amount to permit the entry of sliced bread and like substances into the bag without the substance engaging the edges. The means which I preferably employ includes at least one abutment wall which is yieldable so that the bag may be positioned readily in slice receiving position, this end wall yielding, however, under the pressure of the slices so as to open the end of the bag sufficiently to admit the slices.

Another object of this invention is to provide a tray which is adjustable in width and has a positively controlled guide or presser member which holds the slices properly aligned as they are being moved along the tray, the presser member and the said walls of the tray acting as guides for positioning the bag as well as guides for the bread as it is moved along its path.

Another object of this invention is to provide a movable end wall for the slice receiving tray which moves from a substantially vertical to a horizontal position and which when in its horizontal position does not extend materially beyond the end of the tray. This prevents damage to the bottom of a bag when the end wall moves to the horizontal position. If the end wall, when in the horizontal position, extended materially beyond the end of the tray, it would strike the bottom of the bag and would be apt to tear a hole in the same. This would be particularly true of bags made of thin paper and paper which is easily torn.

Another object of this invention is to provide a method for wrapping sliced bread which includes the steps of slicing a loaf of bread to provide a plurality of slices, maintaining the slices in substantially the same relation to each other as the portions forming the slices bore to each other in the original loaf, and thereafter moving the same while still so held into a bag or the like. In carrying out this process, one may slice a portion of the loaf or the entire loaf or form some of the slices of one thickness and others of another thickness merely by changing the feeding mechanism of the slicing machine.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in a preferred form and the following detailed description of the constructions therein shown.

In the drawings:

Figure 1 is a rear perspective view of a bread slicing machine of conventional type employing a receiving tray constructed in accordance with the present invention, Figure 2 is a vertical sectional view taken on the line 2—2 of Figure 1, Figure 3 is a top plan view of the receiving tray, Figure 4 is a bottom plan view of the receiving tray, Figure 5 is a detail sectional view illustrating one position of the stop or movable end wall of the tray, Figure 6 is a similar view on an enlarged scale, showing the stop or end wall in its ineffective position, Figure 7 is a distended detail perspective view of a portion of the mechanism employed, Figure 8 is a perspective view illustrating the attachment of the device to a type of machine slightly different from that type illustrated in Figure 1, and;

Figure 9 is a detail transverse sectional view taken on the line 9—9 of Figure 8, said view being on an enlarged scale.

Referring to the drawings by reference character A designates a slicing machine of conventional or well known type for slicing bread, B designates a feed tray through which the loaf designated C is fed to the machine and D designates a receiving tray in which the slices E are received.

The slicing machine A is of a character in which slices are formed one at a time by a single slicing knife, the material C being fed along the feed tray B by suitable feeding mechanism which determines the thickness of the slice to be cut. Therefore, a loaf of bread may be cut with some of the slices of one thickness and others of the slices of different thicknesses so that a customer may obtain a single loaf having slices of various thicknesses or of the same thickness. Also the customer may at the time of purchasing secure slices which are either thick or thin depending upon the individual likes or dislikes.

So far as described, this construction is conventional. Such machines with which I am familiar, however, do not employ any means to maintain the slices in upright position in the tray D with the result that the slices often topple over in the tray and in order to be packaged must be gathered together by the operative of the machine and subjected to sufficient pressure to lift the slices as a unit from the tray D and deposit them in a suitable wrapper or container which in the case of retail stores is generally in the form of a paper bag or sack. In placing the slices in the wrapper or container, it often happens that the slices become disarranged, in some cases to such an extent that they cannot all be properly placed in the wrapper or container.

The present invention contemplates a stop which is designated in the drawings by the reference numeral 15. This stop forms in effect, an end wall for the tray D and is movable therealong freely as the slices are delivered from the machine to the tray D, each slice serving to move the stop 15 a distance substantially equal to the thickness of the slice.

The tray D is formed in its bottom wall 16 with a longitudinally extending slot 17 and defining the sides edges of the slot there is a trackway formed by track members 18. A slide 19 is movable along this trackway and the stop is carried by said slide so that the slide forms a support for the stop 15.

The stop 15 is pivotally mounted upon a supporting member 20 which is secured to the slide 19 in any desired manner, by means of a pin or the like 21 which may pass through ears 22 and an opening 23 in the member 20. The member 20 is provided with a stop 24 which prevents pivotal movement of the stop 15 in one direction and the slide 19 carries stop 25 to prevent pivotal movement of the stop 15 in the opposite direction. The stop 24 is preferably rigid and formed integral with the member 20. The stop 25, however, is preferably resilient and in the present embodiment of the invention takes the form of an elongated flat spring rigidly secured as at 26 to the slide 19 and having its free end turned upwardly so that it will engage the stop 15 at a point approximately opposite to the stop 24.

By reference to Figure 5 of the drawings it will be noted that the bottom wall of the tray is provided with an off-set or depressed portion 27 beyond the outer end of the slot 17. This construction provides a shoulder 28 at the outer end of the slot 17 and also provides for the reception and support of the stop 15 on the portion 27 in such a manner that its upper face will be substantially flush with the portion of the tray bottom in which the slot 17 is formed.

So far as described the device operates in the following manner.

A loaf of bread C is placed in the tray B and the machine operated in the ordinary manner. It is to be understood that the stop 15 will at starting, be adjusted close to the machine A in such a manner that the first slice E removed from the loaf C will engage the stop 15. As the loaf is sliced, the slices E continue to feed through the tray D, the stop 15 moving along the tray by reason of its being carried by the slide 19.

The sliced loaf may then be removed either in single slices or may be removed as a unit when it is desired to package the same. In this last instance a suitable container preferably a paper bag F is passed over the free end of the tray D. Means is provided to support the top face of this container F and in the present instance this means consists of a resilient arm 30 carried by a bracket 31 adjustably carried by one side of the tray, the adjustment being maintained by means of a set screw or similar device 32.

Since the end of the arm is resilient and free to move up and down, the positioning of the bag in its operative position is an easy task since even if the opposite walls of the bag are just about equal to the width of the slices to be inserted therein, the member 30 can be depressed while the bag is inserted in operative position. Then when the slices move into a position in close proximity with the mouth of the bag, the pressure of the slices against the member 30 expands the end of the bag and facilitates the entry of the slices into the bag. The member 30, side walls and bottom wall of the tray act as guides for the four sides of the slice and prevent the slices from contacting with the edges of the bag as the slices move into the bag.

The loaf having been completely sliced, the slice nearest the machine is engaged by the hand of the operative and the several slices moved through the tray to the left in Figure 1, the stop 15 being moved therewith.

The operator will generally move the bag F over the tray toward the slicing machine until the bottom of the bag strikes the end of the tray. It will be noted from an inspection of Fig. 6 that when the stop or end wall 15 is in its horizontal position, the end thereof does not project materially beyond the tray. Therefore if this stop moves to its horizontal position, there is little tendency for the same to strike the bottom of the bag and if it does, it will not strike the same at a very sharp angle. Therefore, the bottom of the bag will not be torn by the stop. Generally there is some tendency for the bottom of the bag to move away from the end of the tray and so the bottom of the bag may not even be struck at all, when the stop 15 moves to the position shown in Fig. 6. If the stop 15 projected materially beyond the end of the tray when in the position shown in Fig. 6, there would always be the disadvantage that a hole might be torn in the bottom of the bag when the stop moved to the position shown in that figure.

It will also be noticed that the stop 15 is not very high. This means that when the stop moves to the inoperative position shown in Fig. 6, there is materially less space between the forward slice and the bottom of the bag if the bottom of the bag is held against the end of the tray than the height of the slice which is being formed. Therefore if the forward slice does tilt and fall forward, it will not lie flat on the upper surface of the stop 15 and be jammed between the next slice and the bottom of the bag when the operator moves the remaining slices into the bag. The stop as illustrated is less than one-half the height of an ordinary size loaf of bread. This is particularly desirable in view of the fact that the endmost slice of bread is apt to be slightly less in height than the remaining slices due to the natural taper which is formed on the upper end corners of the loaf of bread. See Fig. 5.

When the slide 19 has reached the outer end of the slot 17 the shoulder 28 will engage and depress the resilient stop 25 to a point where it will disengage the stop 15, the stop 25 being held in its depressed position by the shoulder 28. Continued pressure on the slices E causes the stop 15 to swing about its pivotal point to position upon the off-set portion 27 of the tray bottom as illustrated in Figure 6, and moves the slices E over the stop 15 and into the container F as illustrated in Figure 6. After the sliced loaf has been thus removed from the tray D, the stop 15 may be again elevated in which position it will be held by the resilient stop 25 and moved through the tray to position adjacent the machine A in order that another loaf of bread may be similarly sliced and packaged.

The movement of the stop 15 from the upright position in which it is illustrated in Figure 5 to that position in which it is illustrated in Figure 6 is automatic since immediately upon engagement of the shoulder 28 with the stop 25 the latter is depressed so that the stop 15 may move from the vertical to the horizontal position.

Thus it will be apparent that it is only necessary to slide the slices through the tray D with one continuous movement which movement will serve not only to remove the slices E but to operate a stop 15 to permit of passage of the slices E from the tray.

Means is provided whereby the tray D may be adjustable to accommodate slices formed from loaves of different transverse dimensions and to accomplish this the tray D, in that form of the invention illustrated in Figures 5 to 7 inclusive comprises two members 35 and 36. The member 35 is provided with a lateral extension 37 and this lateral extension together with the opposite side of the tray is provided with bearings 38 by means of which the tray may be attached to the machine A, the bearings 38 engaging openings in arms 39 secured to the machine A as at 40. The member 36 underlies the member 35 and is carried by suitable supports 40. The supports 40 also carry a reciprocating rod or bar 41 and on that end adjacent the machine the bar 41 is provided with rack teeth 42. This bar carries pins 43 which project into the angularly disposed slots 44 in the member 36 of the tray and this construction is so arranged that reciprocating movement of the bar 41 will move the member 36 transversely of the member 35 to increase or decrease the transverse dimension of the tray D. Reciprocating movement is imparted to the bar 41 by means of the gear 45 carried by shaft 46 and operated by hand wheel 47 which projects to a point below the tray D.

From the foregoing it will be apparent that as the hand wheel 47 is rotated the gear 45 meshing with the rack 42 will reciprocate the bar 41 and will, through medium of the pins 43 and the slots 44 move the member 36 of the tray transversely of the tray either to increase or decrease the transverse dimension of the tray.

In order to guide the slices properly into the tray that end of the member 36 which is adjacent the machine A is provided with a resilient extension 50. This extension is preferably rigidly secured as at 51 to the member 36, its free end engaging the member 35 as at 52. As the member 36 is adjusted transversely of the tray the free end of the member 50 will maintain engagement with the member 35 of the tray so that the entrance to the tray will be uninterrupted and a proper feeding of the slices into the tray will be effected.

In Figures 8 and 9, I have shown my invention as attached to a slicing machine of the type in which an entire loaf of bread is sliced in one operation.

In this form of the invention the tray consists of a bottom wall 60 and a side wall 61, the top of the side opposite to the side wall 61 being open. The tray is set at a slight angle to the machine and extends to the left thereof instead of to the right in the heretofore described form of the machine.

In this form of the invention the bottom wall 60 is formed with a slot 62 the side walls of which are defined by track members 63 on which the slide 19 heretofore mentioned is mounted for sliding movement. The slide 19 and its associate parts together with stop 15 are of the same construction as in the heretofore described form.

In this last mentioned form of the invention the sliced loaf is deposited in the tray, its removal therefrom being effected in the same manner as in the heretofore described form, except that as heretofore stated instead of being moved to the right the slices are moved to the left in Figures 8 and 9.

From the foregoing it will be apparent that the present invention provides a new and improved receiving tray for slicing machines in which the several slices may be removed singly as is the case in receiving trays as at present constructed. In addition, however, the present invention provides for the efficient removal of the several slices as a unit without handling and also provides for the support of a container for the reception of the slices and so positions said container that the slices may be deposited directly from the tray thereinto without handling.

While the invention has been herein illustrated in its preferred forms, it is to be understood that it is not to be limited to the specific construction herein illustrated and that it may be practiced in such other forms as rightfully fall within the scope of the appended claims.

Having thus described the invention, what is claimed as new and what it is desired to secure by Letters Patent of the United States, is

1. A tray of the class described including a bottom wall and two side walls, the top and one end wall of said chute being open, a slot extending longitudinally of the bottom wall of the tray, a trackway extending parallel with the slot beneath said bottom wall, a slide mounted in said slot and movable therealong on said trackway, an end wall for said tray pivotally mounted on said slide at a point beneath said bottom wall and movable through the tray therewith, and a recess in said bottom wall near the said open end thereof into which said end wall can move after the same reaches a position adjacent thereto, releasable means for holding said end wall in upright position until it reaches said position adjacent said recess, and means for thereafter releasing said end wall to permit the same to move into said recess substantially in alignment with the bottom wall of said tray.

2. A tray of the class described including a bottom wall and two side walls, the top and one end wall of said chute being open, a slot extending longitudinally of the bottom wall of the tray, a trackway extending parallel with the slot beneath said bottom wall, a slide mounted in said slot and movable therealong on said trackway, an end wall for said tray, means for pivotally mounting said end wall on said slide at a point beneath said bottom wall, and a recess in said bottom wall near the said open end thereof into which said end wall can move after the same reaches a position adjacent thereto, releasable means for holding said end wall in upright position until it reaches said position adjacent said recess, and means for thereafter releasing said end wall to permit the same to move into said recess substantially in alignment with the bottom wall of said tray, said means for releasably supporting said end wall in upright position in the tray comprising a resilient member having engagement with one side of the movable end wall, and means for moving said resilient member out of engagement with said end wall to permit of its moving about its pivotal point to a position within said recess and flush with the bottom of the tray.

3. A tray of the class described including a bottom wall and two side walls, the top and one end wall of said chute being open, a slot extending longitudinally of the bottom wall of the tray, a trackway extending parallel with the slot, a slide mounted in said slot and movable therealong on said trackway, an end wall for said tray, means for pivotally mounting said end wall on said slide, means for supporting said end wall in upright position in the tray, said means including a resilient member having engagement with one side of the movable end wall, and means for moving said resilient member out of engagement with said end wall to permit of its moving about its pivotal point to a position flush with the bottom of the tray, said last mentioned means comprising one end of the slot extending along the bottom wall of said tray.

4. A tray for receiving slices of bread in assembled relation from a slicing machine, comprising a bottom wall having a recess below the supporting portion of said bottom wall adjacent the end of said tray remote from that end which receives the slices, an abutment movable along said bottom wall while maintaining contact with the slices, and releasable means for holding said abutment in engagement with said slices at a substantial angle to the bottom wall until said abutment reaches a position adjacent said recess, means for thereafter releasing said means which holds said abutment in the aforesaid position, whereby the abutment may be moved out of its aforesaid position into said recess with the upper surface thereof substantially parallel with the upper surface of the bottom wall.

5. A slice receiving tray for slicing machines comprising an abutment movable along said tray from substantially one end thereof to the other, means for maintaining said abutment at a substantial angle to the supporting surface of said tray, a recess adjacent one end of said tray for receiving said abutment substantially wholly beneath the upper supporting surface of said tray, and means for releasing the means which holds said abutment at a substantial angle to the supporting surface of said tray when said abutment arrives at a position adjacent said recess, whereafter said abutment moves into said recess substantially flush with the supporting surface of said tray.

6. A tray for slicing machines and the like comprising a bottom wall for supporting the slices as they move along said tray, an abutment for engaging the endmost slice to maintain the slices in upright position as they move along said tray, said abutment having permitted movement angularly with respect to the supporting surface of said tray when said abutment arrives at a position adjacent one end of said tray, whereby the same can be moved out of the path of movement of said slices, the permitted movement being sufficient to permit said abutment to occupy a position substantially flush with the supporting surface of said tray.

7. A tray for slicing machines and the like comprising a slice supporting portion for supporting the slices as they move from one end of the tray to the other, a movable abutment slidable longitudinally of said tray and extending at a substantial angle upwardly from the supporting surface thereof to engage the endmost one of a series of slices arranged in assembled relation, a depression at one end of said tray below the supporting surface thereof for receiving said abutment when said abutment arrives adjacent said recess, means for holding said abutment in its position at a substantial angle to the supporting surface of said tray, and means for releasing said holding means to permit said abutment to be moved into said recess, said recess being of a size to substantially entirely receive said abutment, whereby the end of said abutment as it moves into said recess does not move materially beyond the end of said tray.

8. A tray for slicing machines and the like comprising a slice supporting portion for supporting the slices as they move from one end of the tray to the other, a movable abutment slidable longitudinally of said tray and extending at a substantial angle upwardly from the supporting surface thereof to engage the endmost one of a series of slices arranged in assembled relation, a depression at one end of said tray below the supporting surface thereof for receiving said abutment when said abutment arrives adjacent said recess, means for holding said abutment in its position at a substantial angle to the supporting surface of said tray, and means for releasing said holding means to permit said abutment to be moved into said recess, said recess being of a size to substantially entirely receive said abutment, whereby the end of said abutment as it moves into said recess does not move materially beyond the end of said tray, said means for holding said abutment at a substantial angle to the supporting surface of said tray comprising a releasable spring and a stop against which said abutment is moved by said releasable spring.

9. A tray for slicing machines comprising a trough having a bottom wall, a guide extending longitudinally of said bottom wall, a member guided by said guide, an abutment pivotally mounted on said guide and extending upwardly from the bottom wall of said trough, a stop for limiting the movement of said abutment in one direction, a releasable spring for holding said abutment against said stop, a recess in said trough formed in the bottom wall thereof adjacent one end of said trough for receiving said abutment, and being of sufficient depth to receive said abutment with the upper surface thereof substantially flush with the bottom wall of said trough, and means for releasing said spring when the abutment arrives at a position adjacent said recess to permit said abutment to move into said recess.

10. A tray for slicing machines comprising a trough having a bottom wall, a guide extending longitudinally of said bottom wall, a member guided by said guide, an abutment pivotally mounted on said guide and extending upwardly from the bottom wall of said trough, a stop for limiting the movement of said abutment in one direction, a releasable spring for holding said abutment against said stop, a recess in said trough formed in the bottom wall thereof adjacent one end of said trough for receiving said abutment and being of sufficient depth to receive said abutment with the upper surface thereof substantially flush with the bottom wall of said trough, means for releasing said spring when the abutment arrives at a position adjacent said recess to permit said abutment to move into said recess, and a presser member for engaging the upper edges of the slices supported in said trough.

11. A tray for slicing machines comprising a trough having a bottom wall, a guide extending longitudinally of said bottom wall, a member guided by said guide, an abutment pivotally mounted on said guide and extending upwardly from the bottom wall of said trough, a stop for limiting the movement of said abutment in one direction, a releasable spring for holding said abutment against said stop, a recess in said trough formed in the bottom wall thereof adjacent one end of said trough for receiving said abutment and being of sufficient depth to receive said abutment with the upper surface thereof substantially flush with the bottom wall of said trough, means for releasing said spring when the abutment arrives at a position adjacent said recess to permit said abutment to move into said recess, and a presser member for engaging the upper edges of the slices supported in said trough, said presser member extending substantially the entire length of said trough and being vertically adjustable to increase or decrease the pressure of said member upon said slices.

12. A tray for slicing machines and the like comprising a slice supporting portion for supporting and guiding the slices along a predetermined path, said supporting portion being adjustable in width and having abutments extending upwardly from the sides thereof for engaging the sides of the slices supported by said tray, an abutment slidable longitudinally of said tray for engaging the endmost one of a group of slices, means for frictionally resisting the movement of said abutment along said tray, and a presser bar for holding said slices downwardly against the supporting surface of said tray.

13. In a tray for slicing machines, the combination with a trough for supporting the slices, side walls extending upwardly from the bottom of said trough and adjustable relatively toward and from each other, a slice receiving portion at one end of said tray having abutment walls extending upwardly therefrom at a fixed distance from each other, and a curved guide automatically adjustable upon movement of said relatively adjustable side walls of said tray toward and from each other for guiding slices in between said relatively adjustable side walls as the same are moved from said portion of said tray having the abutment walls at a fixed distance from each other longitudinally of said tray between said relatively adjustable walls, and means for maintaining the slices in assembled relation during their passage along said tray between the relatively adjustable side walls.

14. In a tray for slicing machines, the combination with a trough for supporting the slices, side walls extending upwardly from the bottom of said trough and adjustable relatively toward and from each other, a slice receiving portion at one end of said tray having abutment walls extending upwardly therefrom at a fixed distance from each other, and a curved guide automatically adjustable upon movement of said relatively adjustable side walls of said tray toward and from each other for guiding slices in between said relatively adjustable side walls as the same are moved from said portion of said tray having the abutment walls at a fixed distance from each other longitudinally of said tray between said relatively adjustable walls, and means for maintaining the slices in assembled relation during their passage along said tray between the relatively adjustable side walls, said curved guide comprising a spring contacting with a side wall and contiguous with the guiding surface of one of said adjustable walls.

15. In a slice receiving tray for slicing machines, the combination with a supporting trough and a presser bar spaced above said trough for pressing the slices against said trough, said bar having a free end portion movable toward and from said trough adjacent one end of said trough, whereby a bag or like slice receiving receptacle may be readily positioned over said trough and presser bar prior to the movement of the slices beneath said presser bar, said presser bar yielding in a direction away from said trough when said slice is moved into engagement therewith to open the mouth of a bag positioned thereover and to substantially prevent contact of the edges of the slice with the adjacent edge of the bag into which the slices are being inserted.

16. A tray for slicing machines comprising a bottom slice supporting wall, an abutment movable along said wall substantially from one end thereof to the other, said abutment being adapted to engage the endmost one of a group of slices positioned on said bottom wall, means for maintaining the slices in assembled relation, said abutment being substantially less in height than the end of said loaf and being movable when at a position less than the height of said loaf away from the delivery end of said tray into a position substantially flush with the bottom supporting wall whereby the slices can be moved over said abutment into a container positioned over the end of said trough without interference by said abutment and without the slices falling completely flat on the abutment of the bottom wall of said trough.

17. In a slicing machine, a tray positioned for receiving slices, means for arranging the slices in upright position on the tray, and bag supporting means adjacent the tray, including resilient means adjustably carried by the tray and extending longitudinally over the tray and cooperating therewith for spreading and holding the bag in open position to receive the slices on the tray.

18. In a slicing machine, a tray positioned for receiving slices, means for arranging the slices in upright position on the tray, and bag supporting means carried by the tray including resilient means carried by the tray and cooperating therewith to spread and hold a bag in open position around the end of the tray whereby the slices may be moved along the tray and into the open mouth of the bag.

MORRIS BRUSTOWSKY.